United States Patent
Lee

(10) Patent No.: US 11,438,525 B2
(45) Date of Patent: Sep. 6, 2022

(54) IMAGE DEVICE FOR GENERATING DEPTH IMAGES AND RELATED ELECTRONIC DEVICE

(71) Applicant: eYs3D Microelectronics, Co., Taipei (TW)

(72) Inventor: Chi-Feng Lee, Hsinchu County (TW)

(73) Assignee: eYs3D Microelectronics, Co., Taipei (TW)

( * ) Notice: Subject to any disclaimer, the term of this patent is extended or adjusted under 35 U.S.C. 154(b) by 0 days.

(21) Appl. No.: 17/142,251

(22) Filed: Jan. 6, 2021

(65) Prior Publication Data
US 2021/0160438 A1  May 27, 2021

Related U.S. Application Data

(62) Division of application No. 16/432,911, filed on Jun. 5, 2019, now abandoned.

(Continued)

(51) Int. Cl.
| | |
|---|---|
| *H04N 13/00* | (2018.01) |
| *G06T 7/00* | (2017.01) |
| *H04N 5/262* | (2006.01) |
| *G06T 7/80* | (2017.01) |
| *H04N 13/204* | (2018.01) |
| *G06T 5/00* | (2006.01) |

(Continued)

(52) U.S. Cl.
CPC ........... *H04N 5/2628* (2013.01); *G06T 5/002* (2013.01); *G06T 7/85* (2017.01); *G06T 7/97* (2017.01); *H04N 5/23238* (2013.01); *H04N 13/15* (2018.05); *H04N 13/161* (2018.05); *H04N 13/204* (2018.05); *H04N 13/239* (2018.05); *H04N 13/254* (2018.05);

(Continued)

(58) Field of Classification Search
CPC .. G06T 7/85; G06T 7/97; G06T 5/002; H04N 13/161; H04N 2201/3254; H04N 13/204; H04N 17/002; H04N 2013/0081; H04N 5/2628; H04N 13/254; H04N 13/296; H04N 2201/3277; H04N 5/23238; H04N 13/239; H04N 13/15
See application file for complete search history.

(56) References Cited

U.S. PATENT DOCUMENTS

| | | |
|---|---|---|
| 2013/0077882 A1 | 3/2013 | Venkataraman |
| 2014/0225985 A1 | 8/2014 | Klusza |

(Continued)

FOREIGN PATENT DOCUMENTS

| | | |
|---|---|---|
| CN | 101577795 A | 11/2009 |
| CN | 103729883 A | 4/2014 |

(Continued)

OTHER PUBLICATIONS

Wang. "CN 107105219A Translation". (Year: 2017).*
Kai. "CN101577795A Translation". (Year: 2009).*
Pan. "CN105866966A Translation". (Year: 2016).*

*Primary Examiner* — Zhihan Zhou
(74) *Attorney, Agent, or Firm* — Winston Hsu

(57) ABSTRACT

An image device for generating depth images includes at least two image capturers and a rotating device. When the rotating device rotates the at least two image capturers, multiple images captured by the at least two image capturers are utilized to generate a depth image, wherein a view angle corresponding to the depth image is not less than a view angle of each image capturer of the at least two image capturers.

4 Claims, 8 Drawing Sheets

Related U.S. Application Data

(60) Provisional application No. 62/681,683, filed on Jun. 7, 2018.

(51) Int. Cl.
  *H04N 17/00* (2006.01)
  *H04N 13/15* (2018.01)
  *H04N 13/254* (2018.01)
  *H04N 13/296* (2018.01)
  *H04N 13/239* (2018.01)
  *H04N 13/161* (2018.01)
  *H04N 5/232* (2006.01)

(52) U.S. Cl.
  CPC ......... *H04N 13/296* (2018.05); *H04N 17/002* (2013.01); *H04N 2201/3254* (2013.01); *H04N 2201/3277* (2013.01)

(56) References Cited

U.S. PATENT DOCUMENTS

| | | |
|---|---|---|
| 2015/0356358 A1 | 12/2015 | Okada |
| 2016/0029009 A1 | 1/2016 | Lu |
| 2017/0161561 A1* | 6/2017 | Marty ................. G05D 1/0094 |
| 2018/0108150 A1 | 4/2018 | Curtis |
| 2018/0278916 A1* | 9/2018 | Kim ....................... H04N 5/247 |
| 2019/0082165 A1 | 3/2019 | Cole |

FOREIGN PATENT DOCUMENTS

| | | |
|---|---|---|
| CN | 105866966 A | 8/2016 |
| CN | 106416240 A | 2/2017 |
| CN | 106576160 A | 4/2017 |
| CN | 107105219 A | 8/2017 |
| TW | 201447228 A | 12/2014 |

\* cited by examiner

IMAGE DEVICE FOR GENERATING DEPTH IMAGES AND RELATED ELECTRONIC DEVICE

CROSS REFERENCE TO RELATED APPLICATIONS

This application is a division of U.S. patent application Ser. No. 16/432,911, filed on 2019 Jun. 5, and this application claims the benefit of U.S. Provisional Application No. 62/681,683, filed on Jun. 7, 2018, which are incorporated herein by reference.

BACKGROUND OF THE INVENTION

1. Field of the Invention

The present invention relates to an image device and an electronic device, and particularly to an image device that has a simpler mechanism to generate depth images, and an electronic device that can display a corresponding depth image according to motion or rotation of the electronic device.

2. Description of the Prior Art

In the prior art, an image device for generating panoramic depth images usually includes two image capturing groups, and each image capturing group includes more than two image capturers, wherein one image capturing group of the two image capturing group is used for capturing a plurality of first images, and the other image capturing group of the two image capturing group is used for capturing a plurality of second images. Then, a processor of the image device utilizes the plurality of first images and the plurality of second images to generate multiple depth images corresponding to different view angles, and stitches the multiple depth images as a 360 degree panoramic depth image. However, because optical centers of a plurality of image capturers included in the each image capturing group cannot completely overlap (that is, a mechanism of the image device has an intrinsic defect), the image device first needs to execute image processing on a plurality of images captured by the plurality of image capturers (e.g. integrating the optical centers of the plurality of image capturers into a virtual optical center) to generate the 360 degree panoramic depth image, otherwise a problem of blind spots will occur at stitching regions of the 360 degree panoramic depth image.

In addition, when an electronic device provided by the prior art displays a 360 degree panoramic color image, the electronic device takes the electronic device as a center to display the 360 degree panoramic color image. That is, when a user controls the electronic device to view the 360 degree panoramic color image through a touch mode, the electronic device can only change a view angle for displaying the 360 degree panoramic color image. Therefore, when the electronic device is moved, the electronic device cannot change an image displayed by the electronic device according to motion of the electronic device.

Therefore, how to solve the above-mentioned problems of the prior art becomes an important issue.

SUMMARY OF THE INVENTION

An embodiment of the present invention provides an image device for generating depth images. The image device includes at least two image capturers and a rotating device. When the rotating device rotates the at least two image capturers, multiple images captured by the at least two image capturers are utilized to generate a depth image, wherein a view angle corresponding to the depth image is not less than a view angle of each image capturer of the at least two image capturers.

Another embodiment of the present invention provides an image device for generating depth images. The image device includes at least one image capturer, at least one light source, and a rotating device. The at least one light source is used for emitting emission light. When the rotating device rotates the at least one image capturer and the at least one light source, multiple images captured by the at least one image capturer and the emission light are used for generating a depth image, wherein a view angle corresponding to the depth image is not less than a view angle of each image capturer of the at least one image capturer.

Another embodiment of the present invention provides an electronic device for viewing a panoramic color and depth image. The electronic device includes a display and a processor. The processor is used for reading a 360 degree panoramic color image and a 360 degree panoramic depth image, wherein the 360 degree panoramic color image corresponds to the 360 degree panoramic depth image. When the electronic device is moved or rotated, the processor further converts a part of the 360 degree panoramic color image corresponding to a view angle corresponding to motion or rotation of the electronic device into a planar color image and a part of the 360 degree panoramic depth image corresponding to the view angle into a planar depth image according to the view angle, combines the planar color image with the planar depth image to generate a planar color and depth image corresponding to the view angle, and makes the display display the planar color image according to the planar color and depth image.

The present invention provides an image device for generating depth images and related electronic device. Because the image device utilizes a rotating device to rotate a plurality of image capturers included in the image device, and utilizes a processor to generate a depth image according to plurality of images captured by the plurality of image capturers, compared to the prior art, the image device does not have a problem that optical centers in the prior art cannot overlap. In addition, because a 360 degree panoramic color and depth image generated by the present invention has depth information of a 360 degree panoramic depth image, compared to the prior art, when the electronic device displays the 360 degree panoramic color and depth image, the electronic device can display a corresponding planar color and depth image according to motion or rotation of the electronic device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
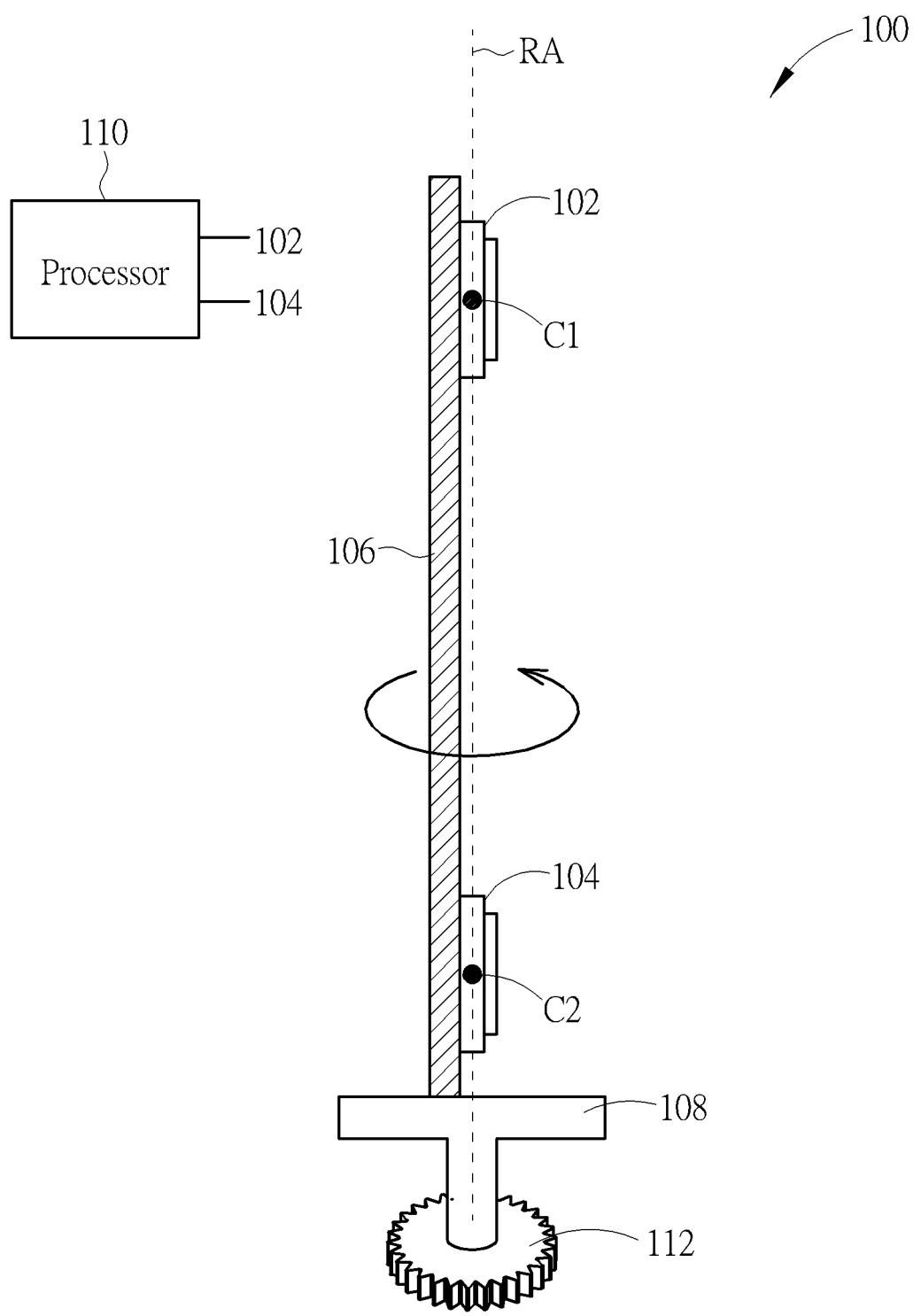
FIG. 1 is a diagram illustrating an image device for generating depth images according to a first embodiment of the present invention.

Please refer to FIG. 1. FIG. 1 is a diagram illustrating an image device 100 for generating depth images according to a first embodiment of the present invention, wherein as shown in FIG. 1, the image device 100 includes two image capturers 102, 104, a supporting unit 106, a rotating device 108, and a processor 110, the supporting unit 106 is coupled to the rotating device 108, the processor 110 is coupled to the image capturers 102, 104, the image capturers 102, 104 are installed on the supporting unit 106, and the image capturers 102, 104 are non-fisheye image capturers. But, in another embodiment of the present invention, the image capturers 102, 104 are fisheye image capturers. In addition, the present invention is not limited to the image device 100 including the image capturers 102, 104. That is, the image device 100 can include more than two image capturers. In addition, one of ordinary skill in the art should well know that each image capturer of the image capturers 102, 104 at least includes a lens and an image sensor (e.g. a charge-coupled device (CCD) image sensor or a complementary metal-oxide-semiconductor image sensor). In addition, in another embodiment of the present invention, the processor 110 is installed in a host outside the image device 100.

Figure 2:
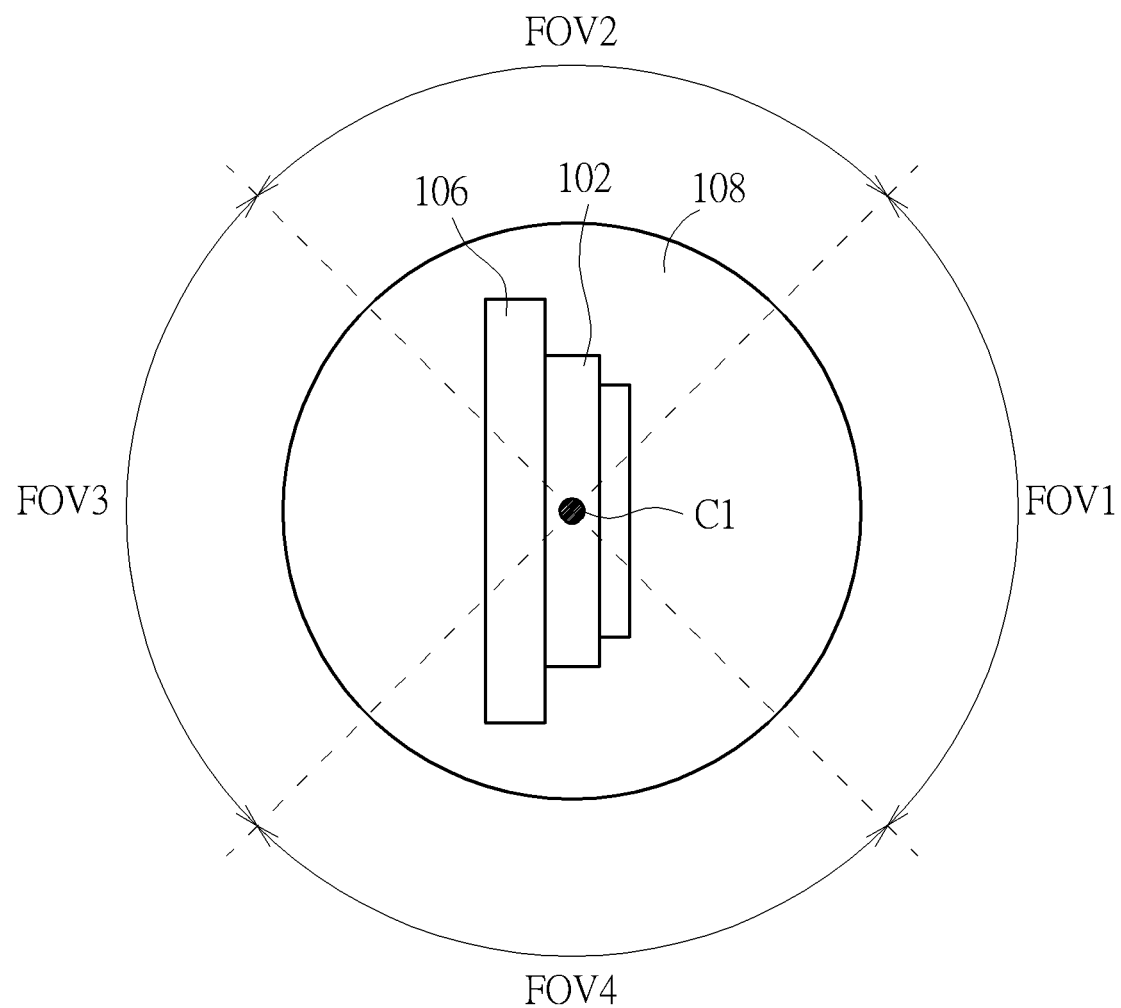
FIG. 2 is a diagram illustrating a top view of the image device.

As shown in FIG. 1, a rotating axis RA of the rotating device 108 passes through an optical center C1 of the image capturer 102 and an optical center C2 of the image capturer 104, and the rotating device 108 can rotate the image capturers 102, 104 by the supporting unit 106, wherein the rotating device 108 is driven by a gear 112. But, in another embodiment of the present invention, the rotating device 108 is driven by a motor. When the rotating device 108 rotates the image capturers 102, 104, if a sum of view angles corresponding to a plurality of first images captured by the image capturer 102 is not less than 360 degrees (a sum of view angles corresponding to a plurality of second images captured by the image capturer 104 is not less than 360 degrees), the processor 110 can stitch the plurality of first images to generate a first 360 degree panoramic color image and stitch the plurality of second images to generate a second 360 degree panoramic color image according to a feature point matching method or a fixed angle method provided by the prior art. For example, when the rotating device 108 rotates the image capturers 102, 104, the image capturer 102 can capture 4 first images IM11-IM14 and the image capturer 104 can capture 4 second images IM21-IM24, wherein the first image IM11 and the second image IM21 correspond to a first view angle FOV1, the first image IM12 and the second image IM22 correspond to a second view angle FOV2, the first image IM13 and the second image IM23 correspond to a third view angle FOV3, the first image IM14 and the second image IM24 correspond to a fourth view angle FOV4, the first view angle FOV1, the second view angle FOV2, the third view angle FOV3, and the fourth view angle FOV4 can be referred to FIG. 2, and all of the first view angle FOV1, the second view angle FOV2, the third view angle FOV3, and the fourth view angle FOV4 are equal to 90 degrees. But, in another embodiment of the present invention, the first view angle FOV1, the second view angle FOV2, the third view angle FOV3, and the fourth view angle FOV4 can be different from each other. In addition, because FIG. 2 is a top view of the image device 100, FIG. 2 does not show the image capturer 104. Therefore, after the image capturer 102 captures the first images IM11-IM14 and the image capturer 104 captures the second images IM21-IM24, the processor 110 can stitch the first images IM11-IM14 to generate the first 360 degree panoramic color image and stitch the second images IM21-IM24 to generate the second 360 degree panoramic color image according to the feature point matching method (e.g. feature points of the first images IM11-IM14 and feature points of the second images IM21-IM24) or the fixed angle method (e.g. the first view angle FOV1, the second view angle FOV2, the third view angle FOV3, and the fourth view angle FOV4). In addition, after the processor 110 generates the first 360 degree panoramic color image and the second 360 degree panoramic color image, the processor 110 can utilize the first 360 degree panoramic color image and the second 360 degree panoramic color image to generate a 360 degree panoramic depth image, wherein in one embodiment of the present invention, each depth value of the 360 degree panoramic depth image corresponds to the optical center C1 or the optical center C2. But, in another embodiment of the present invention, the each depth value of the 360 degree panoramic depth image corresponds to a plane where the optical center C1 and the optical center C2 are located. In addition, in another embodiment of the present invention, the processor 110 can generate a first depth image corresponding to the first view angle FOV1 according to the first image IM11 and the second image IM21, generate a second depth image corresponding to the second view angle FOV2 according to the first image IM12 and the second image IM22, generate a third depth image corresponding to the third view angle FOV3 according to the first image IM13 and the second image IM23, and generate a fourth depth image corresponding to the fourth view angle FOV4 according to the first image IM14 and the second image IM24. Then, the processor 110 stitches the first depth image, the second depth image, the third depth image, and the fourth depth image to generate the 360 degree panoramic depth image according to the feature point matching method or the fixed angle method. In addition, in another embodiment of the present invention, when the rotating device 108 rotates the image capturers 102, 104, the image capturer 102 can capture the plurality of first images and the image capturer 104 can capture the plurality of second images, wherein the plurality of first images correspond to the plurality of second images, a view angle corresponding to the plurality of first images is between 360 degrees and a view angle of the image capturer 102 (or a view angle of the image capturer 104). Therefore, a view angle corresponding to a color image generated by the processor 110 stitching the plurality of first images (or stitching the plurality of second images) is also between 360 degrees and the view angle of the image capturer 102 (or the view angle of the image capturer 104). Meanwhile, a view angle corresponding to a depth image generated by the processor 110 according to the plurality of first images and the plurality of second images is also between 360 degrees and the view angle of the image capturer 102 (or the view angle of the image capturer 104).

Figure 3A:
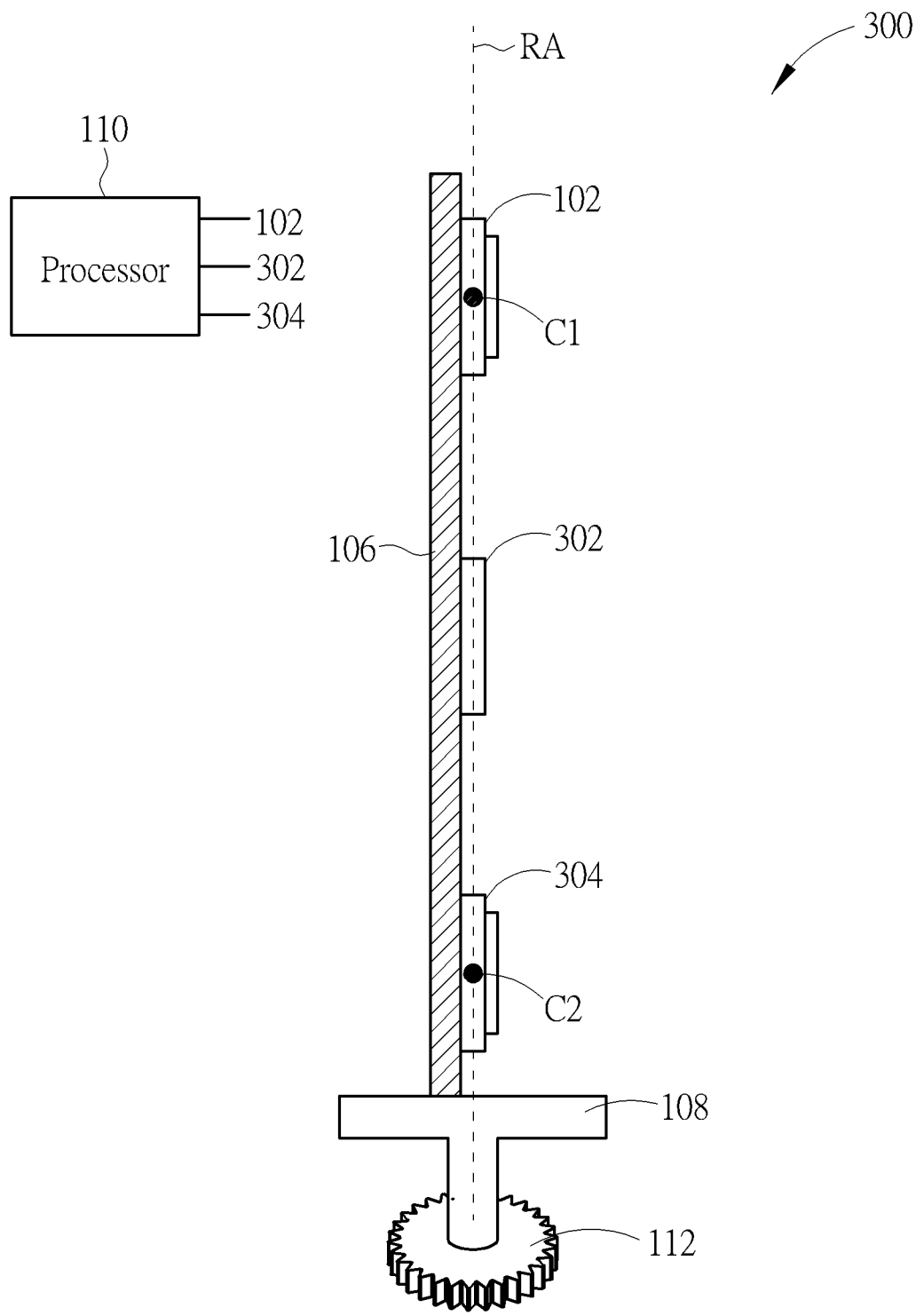
FIG. 3A is a diagram illustrating an image device for generating depth images according to a second embodiment of the present invention.

After the processor 110 generates the 360 degree panoramic depth image, the processor 110 can combine the first 360 degree panoramic color image (or the second 360 degree panoramic color image) with the 360 degree panoramic depth image to generate a 360 degree panoramic color and depth image, and the processor 110 compresses the first 360 degree panoramic color image (or the second 360 degree panoramic color image) according to a standard compression format (e.g. a Joint Photographic Experts Group (JPEG) format) and compresses the 360 degree panoramic depth image according to a lossy format (or a lossless format) to integrate the 360 degree panoramic color and depth image into a file, wherein a compressed 360 degree panoramic depth image is stored in a header of the file. That is, the compressed 360 degree panoramic depth image is usually stored in a user defined header of the file. In addition, the standard compression format is not limited to JPEG, that is, the first 360 degree panoramic color image (or the second 360 degree panoramic color image) can also be compressed according to PNG, MPEG1, MPEG2, MPEG4, H.264, H.265, and so on. In addition, in another embodiment of the present invention, when the 360 degree panoramic color and depth image is integrated into the file, the 360 degree panoramic depth image is not compressed Please refer to FIG. 3A. FIG. 3A is a diagram illustrating an image device 300 for generating depth images according to a second embodiment of the present invention, wherein as shown in FIG. 3A, differences between the image device 300 and the image device 100 are that the image device 300 further includes a light source 302, an image capturer 304 are used for capturing a plurality of second images including emission light generated by the light source 302, the processor 110 is coupled to the light source 302, the image capturer 304, and the image capturer 102, and the light source 302, the image capturer 304, and the image capturer 102 are installed on the supporting unit 106. In addition, the emission light is structured light (or the emission light includes a random pattern), and the light source 302 utilizes a collimator, at least one laser beam (e.g. at least one infrared laser beam), and at least one optical element (e.g. at least one diffraction optical element (DOE) to generate the emission light. But, in another embodiment of the present invention, the light source 302 does not need the collimator. As shown in FIG. 3A, when the rotating device 108 rotates the light source 302, the image capturer 304, and the image capturer 102, the plurality of first images captured by the image capturer 102 are used for generating a 360 degree panoramic color image, the plurality of second images including the emission light captured by the image capturer 304 are used for generating a 360 degree panoramic depth image, wherein the sum of the view angles corresponding to the plurality of first images is not less than 360 degrees, and a sum of view angles corresponding to the plurality of second images is also not less than 360 degrees. In addition, in one embodiment of the present invention, the processor 110 can turn the light source 302 according to at least one of luminance of an environment which the image device 300 is located at, a quality of the 360 degree panoramic depth image, and a difference of the 360 degree panoramic depth image corresponding to turning-on and turning-off of the light source 302. In addition, in another embodiment of the present invention, when the light source 302 is a vertical-cavity surface-emitting Laser (VCSEL), the light source 302 optionally includes the collimator and the at least one optical element. That is, the collimator and the at least one are not necessary for the light source 302. In addition, in another embodiment of the present invention, the light source 302 can be a light source with other configurations and wavelengths.

In addition, in another embodiment of the present invention, the processor 110 can optionally adjust intensity of the light source 302 according to luminance corresponding to each second image of the plurality of second images and a target value, wherein the target value is set according to reflection coefficient of a human skin of a user corresponding to the structured light emitted by the light source 302. For example, the processor 110 can generate a luminance distribution map corresponding to the each second image according to the each second image, and optionally adjust the intensity of the light source 302 according to a percentage of the each second image occupied by an area corresponding to a maximum luminance value of at least one luminance value within the luminance distribution map greater than the target value. In addition, in another embodiment of the present invention, the processor 110 can optionally adjust the intensity of the light source 302 according to average luminance of the each second image and the target value. In addition, in another embodiment of the present invention, the processor 110 can generate a luminance histogram corresponding to a plurality of pixels of the each second image according to the each second image, and optionally adjust the intensity of the light source 302 according to a median of the luminance histogram and the target value, or according to a predetermined quantile of the luminance histogram and the target value.

In addition, in another embodiment of the present invention, after the light source 302 is turned on, the processor 110 can optionally dynamically adjust the intensity of the light source 302 according to a distance between at least one predetermined object within the each second image and the image capturer 304 (or the image capturer 102) and a first lookup table, wherein the first lookup table stores relationships between a distance corresponding to an object and the intensity of the light source 302. In addition, in another embodiment of the present invention, the processor 110 continuously detects the luminance of the environment which the image device 300 is located at under the light source 302 being turned off. When the luminance of the environment is brighter, the processor 110 increases the intensity of the light source 302 (when the light source 302 is turned on) according to a second lookup table, wherein the second lookup table stores relationships between the intensity of the light source 302 (when the light source 302 is turned on) and the luminance of the environment.

In addition, in the above-mentioned embodiments, when the processor 110 utilizes a first pulse width modulation signal in a continuous mode to adjust the intensity of the emitted light, the processor 110 can adjust the intensity of the emitted light by changing a duty cycle of the first pulse width modulation signal; in the above-mentioned embodiments, when the processor 110 utilizes a second pulse width modulation signal in a burst mode to adjust the intensity of the emitted light, the processor 110 can adjust the intensity of the emitted light by changing an enabling time of the second pulse width modulation signal; in the above-mentioned embodiments, when the processor 110 utilizes the first pulse width modulation signal and the second pulse width modulation signal to adjust the intensity of the emitted light, the processor 110 can adjust the intensity of the emitted light by simultaneously changing the enabling time of the second pulse width modulation signal and the duty cycle of the first pulse width modulation signal.

In addition, subsequent operational principles of the image device 300 can be referred to those of the image device 100, so further description thereof is omitted for simplicity.

In addition, in another embodiment of the present invention, the light source 302 is applied to a time of flight (TOF), wherein when the light source 302 is applied to the time of flight, the emission light is diffused light, that is, the emission light is uniform light. Therefore, the processor 110 can generate the 360 degree panoramic depth image according to a difference between a receiving time for the image capturer 304 receiving reflected light and a generating time corresponding to the emission light, wherein the reflected light is generated by at least one object reflecting the emitted light, and meanwhile the image capturer 304 is a time of flight sensor. In addition, when the light source 302 is applied to the time of flight, operational principles of the processor 110 determining whether to adjust the intensity of the emitted light can be referred to the above-mentioned corresponding descriptions, so further description thereof is omitted for simplicity.

In addition, because the above-mentioned functions of the processor 110 are fully disclosed, one of ordinary skill in the art should easily utilize a field programmable gate array (FPGA) with the above-mentioned functions of the processor 110, or an application-specific integrated circuit (ASIC) with the above-mentioned functions of the processor 110, or a software module with the above-mentioned functions of the processor 110, or an analog integrated circuit with the above-mentioned functions of the processor 110 to realize the processor 110 according to corresponding descriptions of the above-mentioned functions of processor 110. Therefore, a corresponding structure of the processor 110 is omitted for simplicity.

In addition, in another embodiment of the present invention, the image capturer 102 and the image capturer 304 can act as a stereo camera (or a depth camera), and the emission light generated by the light source 302 is used for assisting the stereo camera. The processor 110 can utilize a time division multiplexing method to control the light source 302. When the processor 110 control the light source 302 to generate the emission light, the stereo camera acts as the stereo camera, and when the processor 110 turns off the light source 302, images captured by the image capturer 102 and the image capturer 304 are used for generating a color image.

Figure 3B:
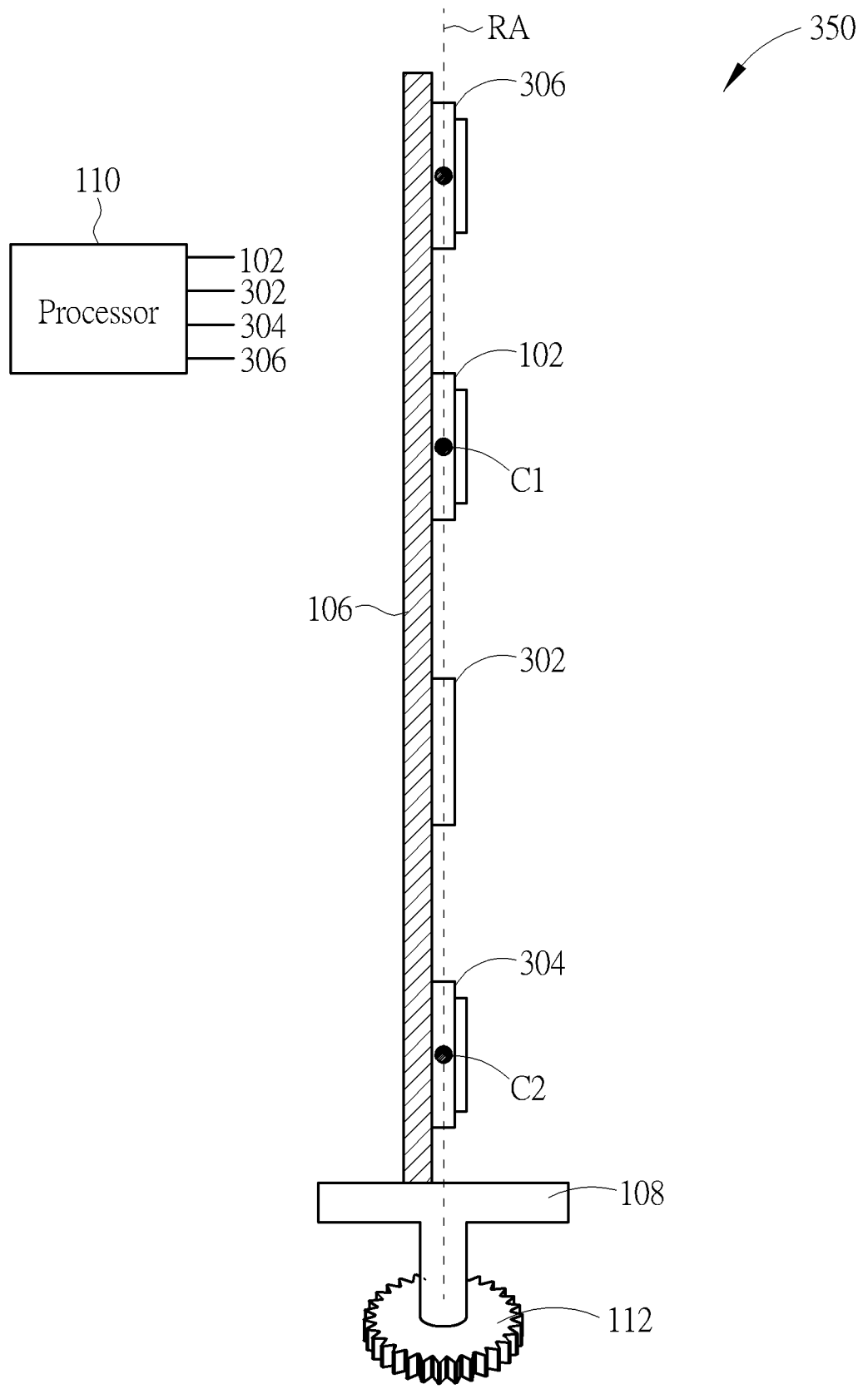
FIG. 3B is a diagram illustrating an image device for generating depth images according to another embodiment of the present invention.

In addition, please refer to FIG. 3B. FIG. 3B is a diagram illustrating an image device 350 for generating depth images according to another embodiment of the present invention, wherein as shown in FIG. 3B, a difference between the image device 350 and the image device 300 is that the image device 350 further includes an image capturer 306, wherein the image capturer 102 and the image capturer 304 can act as a stereo camera (or a depth camera), the emission light generated by the light source 302 is used for assisting the stereo camera, and images captured by the image capturer 306 are used for generating a color image (that is, the image capturer 306 only acts as a color sensor and has an infrared light filter). In addition, operational principles of the image capturer 102, the image capturer 304, and the image capturer 306 can be referred to the above-mentioned corresponding descriptions, so further description thereof is omitted for simplicity.

Figure 3C:
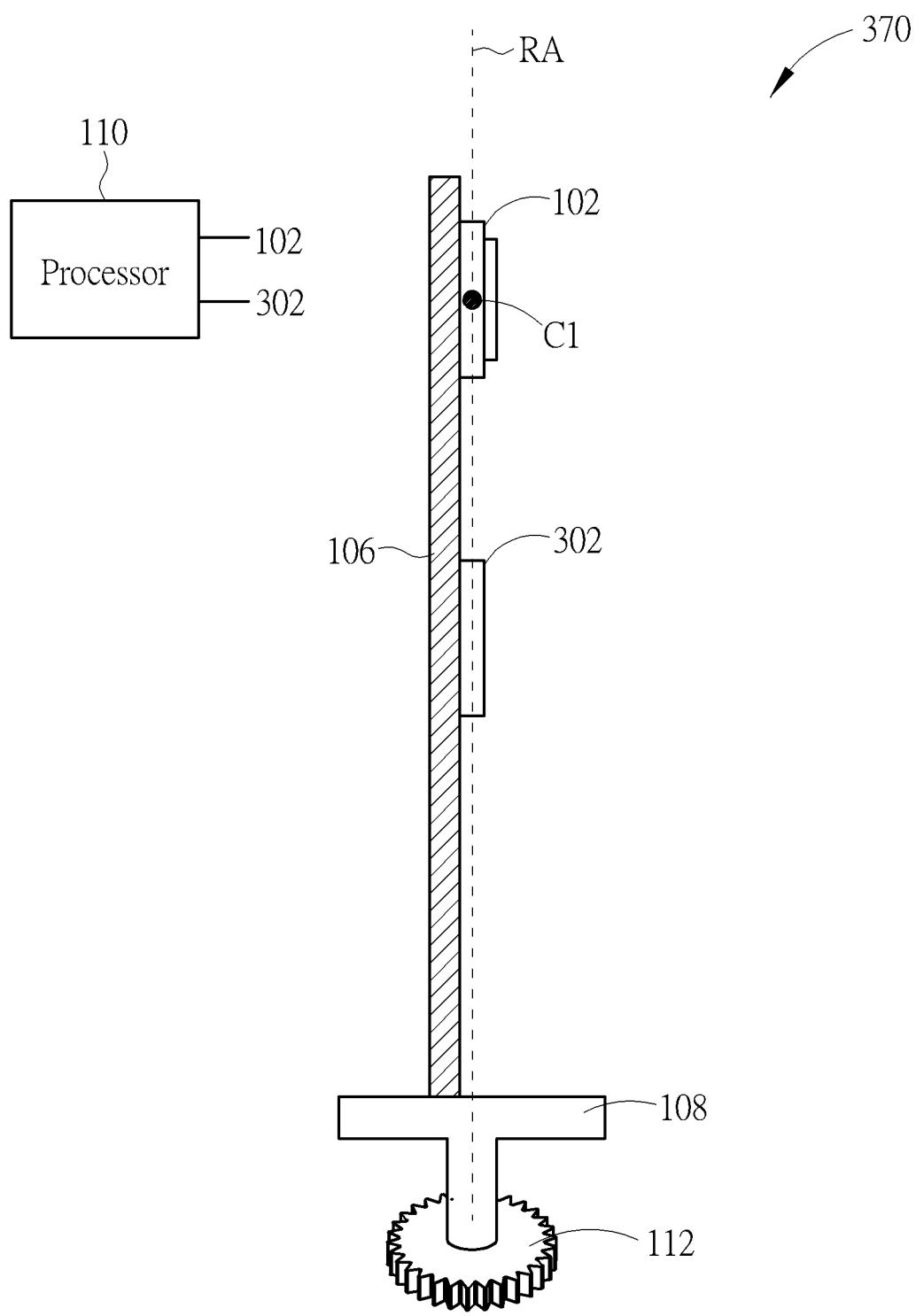
FIG. 3C is a diagram illustrating an image device 370 for generating depth images according to another embodiment of the present invention.

In addition, please refer to FIG. 3C. FIG. 3C is a diagram illustrating an image device 370 for generating depth images according to another embodiment of the present invention, wherein as shown in FIG. 3C, a difference between the image device 370 and the image device 300 is that the image device 370 does not include the image capturer 304. As shown in FIG. 3C, when the emission light is structured light, the image capturer 102 is a structured light depth sensor. In addition, the image capturer 102 can be a time of flight sensor, meanwhile the emission light is diffused light, and the operational principles of the image capturer 102 can be referred to the above-mentioned corresponding descriptions, so further description thereof is omitted for simplicity.

Figure 4:
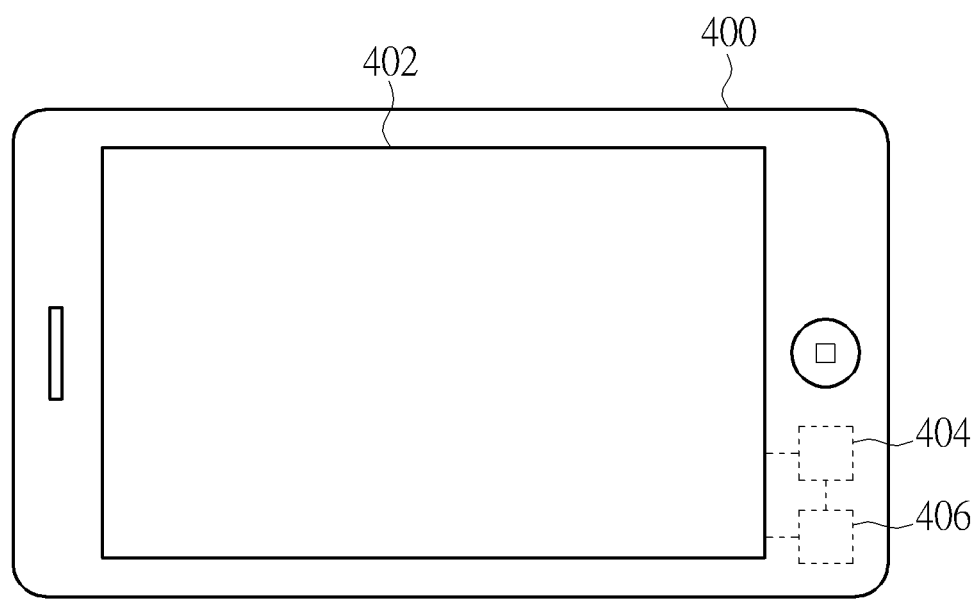
FIG. 4 is a diagram illustrating an electronic device for viewing a panoramic color and depth image according to a third embodiment of the present invention.

Please refer to FIG. 4. FIG. 4 is a diagram illustrating an electronic device 400 for viewing a panoramic color and depth image according to a third embodiment of the present invention, wherein as shown in FIG. 4, the electronic device 400 includes a display 402, a processor 404, and an inertial sensor 406 (e.g. an inertial measurement unit, IMU), the processor 404 is coupled to the display 402 and the inertial sensor 406 (because the processor 404 and the inertial sensor 406 are installed within the electronic device 400, related coupling lines corresponding to the processor 404 and the inertial sensor 406 are represented by dotted lines), and the inertial sensor 406 can be a gyro, an accelerator, a micro-electromechanical systems (MEMS), and so on. In addition, the electronic device 400 can be a smart phone or a tablet computer. But, the present invention is not limited to the electronic device 400 being a smart phone or a tablet computer. As shown in FIG. 4, after the processor 404 receives a 360 degree panoramic color and depth image generated from the image device 100 (or the image device 300), the processor 404 can first read a 360 degree panoramic color image and a 360 degree panoramic depth image of the 360 degree panoramic color and depth image, or respectively read a 360 degree panoramic color image and a 360 degree panoramic depth image generated from other image devices, wherein each depth value of the 360 degree panoramic depth image corresponds to a virtual optical center which the electronic device 400 acts as.

Figure 5:
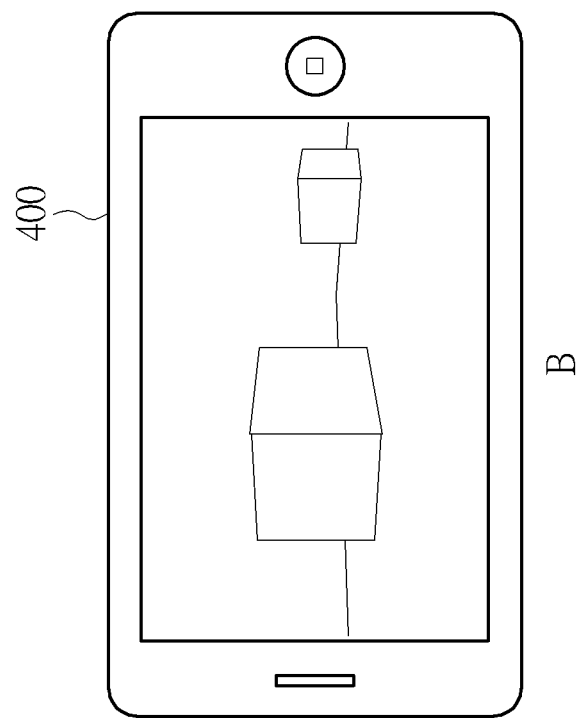
FIG. 5 is a diagram illustrating the electronic device being moved from a position to another position.
Figure 5:
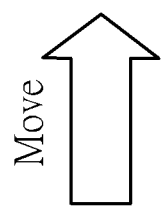
Figure 5:
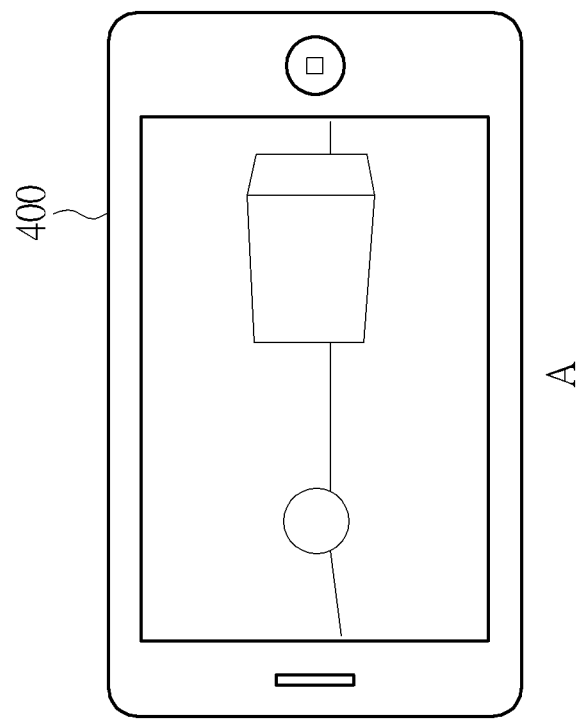

When the electronic device 400 is moved or rotated (e.g. as shown in FIG. 5, the electronic device 400 is moved from a position A to a position B), the inertial sensor 406 can determine a view angle corresponding to motion or rotation of the electronic device 400 according to the motion or the rotation of the electronic device 400 (that is, the view angle corresponds to the position B). After the inertial sensor 406 determines the view angle, the processor 404 can convert a part of the 360 degree panoramic color image corresponding to the view angle into a planar color image and convert a part of the 360 degree panoramic depth image corresponding to the view angle into a planar depth image according to the view angle, and utilize a depth-image-based rendering (DIBR) provided by the prior art to combine the planar color image with the planar depth image to generate a planar color and depth image corresponding to the view angle, wherein when the display 402 displays the planar color and depth image, because the planar color and depth image has depth information of the planar depth image, the planar color and depth image can make a user watching the planar color and depth image have a three-dimensional feeling. In addition, each depth value of the planar depth image corresponds to a virtual optical plane where the electronic device 400 is located. In addition, in another embodiment of the present invention, the user of the electronic device 400 utilizes a mouse or touches the display 402 to change a view angle of the display 402 for displaying the 360 degree panoramic color and depth image. In addition, in another embodiment of the present invention, the 360 degree panoramic color image and the 360 degree panoramic depth image correspond to two different optical centers, the processor 404 can utilize the prior art to compensate a shift between the two different optical centers when the display 402 displays the planar color and depth image.

Figure 6:
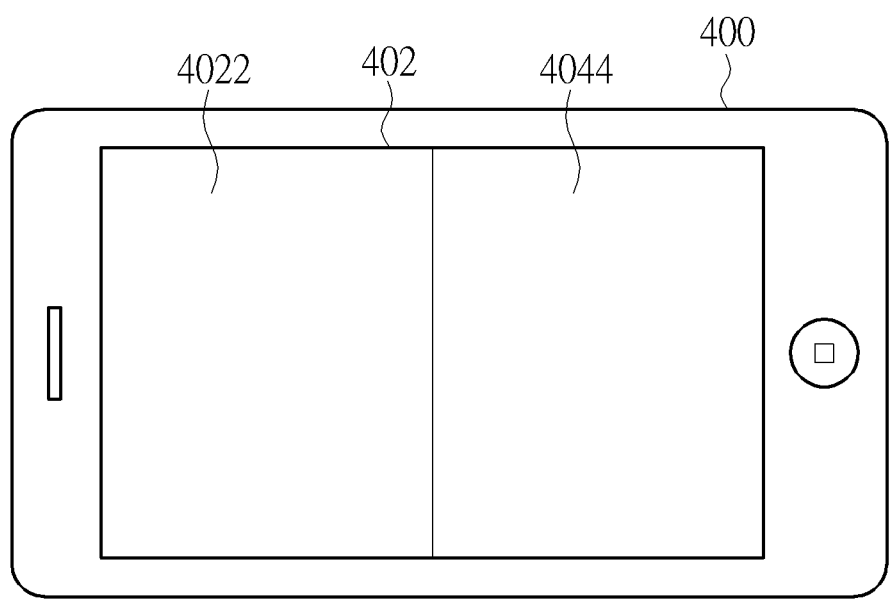
FIG. 6 is a diagram illustrating a block of the display displaying the corresponding left eye color image and another block of the display displaying the corresponding right eye color image.

In addition, because the planar color and depth image has the depth information of the planar depth image, when the electronic device 400 is applied to virtual reality (VR), augmented reality (AR), substitutional reality (SR), and mixed reality (MR), the processor 404 can convert the planar color and depth image into a corresponding left eye color image and a corresponding right eye color image according to the depth information of the planar depth image and the depth-image-based rendering, wherein as shown in FIG. 6, a block 4022 of the display 402 displays the corresponding left eye color image and a block 4024 of the display 402 displays the corresponding right eye color image. Therefore, when the electronic device 400 is mounted in a head mounted display, the user can view contents of the virtual reality (VR), the augmented reality (AR), the substitutional reality (SR), and the mixed reality (MR) through the head mounted display and the electronic device 400. In addition, in another embodiment of the present invention, the block 4022 of the display 402 is independent from the block 4024 of the display 402. That is, the block 4022 and the block 4024 are two independent displays.

In addition, because the above-mentioned functions of the processor 404 are fully disclosed, one of ordinary skill in the art should easily utilize a field programmable gate array with the above-mentioned functions of the processor 404, or an application-specific integrated circuit with the above-mentioned functions of the processor 404, or a software module with the above-mentioned functions of the processor 404, or an analog integrated circuit with the above-mentioned functions of the processor 404 to realize the processor 404 according to corresponding descriptions of the above-mentioned functions of processor 404. Therefore, a corresponding structure of the processor 404 is omitted for simplicity.

To sum up, because the image device utilizes the rotating device to rotate the image capturers, and utilizes the processor to generate a 360 degree panoramic depth image according to multiple images captured by the image capturers, compared to the prior art, the image device does not have a problem that optical centers in the prior art cannot overlap. In addition, because a 360 degree panoramic color and depth image generated by the present invention has depth information of a 360 degree panoramic depth image, compared to the prior art, when the electronic device displays the 360 degree panoramic color and depth image, the electronic device can display a corresponding planar color and depth image according to motion or rotation of the electronic device.

Although the present invention has been illustrated and described with reference to the embodiments, it is to be understood that the invention is not to be limited to the disclosed embodiments, but on the contrary, is intended to cover various modifications and equivalent arrangements included within the spirit and scope of the appended claims.

What is claimed is:

1. An electronic device for viewing a panoramic color and depth image, comprising:
   a display; and
   a processor reading an existed 360 degree panoramic color image and an existed 360 degree panoramic depth image, wherein the existed 360 degree panoramic color image corresponds to the existed 360 degree panoramic depth image, and the existed 360 degree panoramic color image and the existed 360 degree panoramic depth image are generated outside of the electronic device;
   wherein when the electronic device is moved or rotated, the processor further converts a part of the existed 360 degree panoramic color image corresponding to a view angle corresponding to motion or rotation of the electronic device into a planar color image and a part of the existed 360 degree panoramic depth image corresponding to the view angle into a planar depth image according to the view angle, combines the planar color image with the planar depth image to generate a planar color and depth image corresponding to the view angle, and makes the display the planar color image according to the planar color and depth image.

2. The electronic device of claim 1, further comprising:
   an inertial sensor determining the view angle corresponding to the motion or the rotation of the electronic device according to the motion or the rotation of the electronic device.

3. The electronic device of claim 1, wherein each depth value of the existed 360 degree panoramic depth image corresponds to a virtual optical center which the electronic device acts as, and each depth value of the planar depth image corresponds to a virtual optical plane where the electronic device is located.

4. The electronic device of claim 1, wherein when the processor combines the planar color image with the planar depth image to generate the planar color and depth image, the processor converts the planar depth image into depth information corresponding to a virtual optical plane to make the planar color and depth image have the depth information.

\* \* \* \* \*